United States Patent Office 2,933,538
Patented Apr. 19, 1960

2,933,538

DRYING OIL

Augustus Bailey Small, Baton Rouge, La., assignor to Esso Research and Engineering Company, a corporation of Delaware No Drawing. Application January 24, 1956
Serial No. 561,154

4 Claims. (Cl. 260—666)

This invention relates to the catalytic polymerization of cyclodiolefins and pertains particularly to the preparation of drying oils from cyclodiolefins.

It is known to polymerize cyclodiolefins, such as cyclopentadiene, methyl cyclopentadiene and the like, with Friedel-Crafts type catalysts, such as aluminum chloride, aluminum bromide and the like, or their complexes with organic compounds. The polymer thus produced is a hard resin-like material.

It has now been found that liquid, oily-type polymers can be prepared from cyclodiolefins by carrying out the reaction in the presence of a solution of aluminum bromide in a non-complex-forming, non-freezing solvent, e.g. an alkyl halide such as methyl chloride or ethyl chloride. The reaction temperature varies between $-24°$ C. and $+20°$ C. Cyclodiene solutions of any suitable concentration can be used. The invention is applicable to the polymerization of cyclopentadiene or any of the substituted cyclopentadienes having the cyclopentadiene nucleus containing the characteristic conjugated double bonds, such as methyl cyclopentadiene, dimethyl cyclopentadiene and other alkyl and aryl substituted cyclopentadienes.

The aluminum bromide is used in an amount between 5 and 15%, based on cyclodiene and is employed as a substantially saturated solution.

The following specific example will serve to further illustrate the invention:

To 95 grams of dimethyl cyclopentadiene there was added a solution of 8 grams of aluminum bromide in 100 g. methyl chloride. The temperature was held between $-24°$ C. and $+20°$ C. while agitating. At the conclusion of the reaction the catalyst was hydrolyzed by means of an alkali and the mixture filtered. The filtrate was an oily liquid that was soluble in hexane and insoluble in isopropyl alcohol. A film of the oil was found to dry in air in the presence of conventional driers in less than an hour to form a tightly adhering, flexible film.

The nature of the present invention having been thus fully set forth and specific examples of the same given, what is claimed as new and useful and desired to be secured by Letters Patent is:

1. A process for preparing oily polymers which comprises polymerizing a cyclic diene compound selected from the group consisting of cyclopentadiene and alkyl substituted cyclopentadienes, by contacting said cyclic diene with a solution of aluminum bromide in an alkyl halide solvent at a temperature between $-24°$ C. and $+20°$ C. said aluminum bromide being present in an amount between 5 and 15% of the cyclic diene compound.

2. Process according to claim 1 in which the solvent is methyl chloride.

3. Process according to claim 1 in which the cyclic diene is dimethyl-cyclopentadiene.

4. An oily polymer of dimethyl-cyclopentadiene which forms tightly adhering flexible films after drying in air for less than an hour.

References Cited in the file of this patent

UNITED STATES PATENTS

| | | |
|---|---|---|
| 2,314,909 | Trepp | Mar. 30, 1943 |
| 2,356,128 | Thomas et al. | Aug. 22, 1944 |
| 2,434,403 | Frey | Jan. 13, 1948 |
| 2,481,498 | Carnell | Sept. 13, 1949 |
| 2,578,214 | West | Dec. 11, 1951 |
| 2,780,664 | Serniuk | Feb. 5, 1957 |